(12) United States Patent
Hawkes et al.

(10) Patent No.: US 8,837,741 B2
(45) Date of Patent: Sep. 16, 2014

(54) SYSTEMS AND METHODS FOR ENCODING EXCHANGES WITH A SET OF SHARED EPHEMERAL KEY DATA

(75) Inventors: Philip Michael Hawkes, Warrimoo (AU); George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/610,738

(22) Filed: Sep. 11, 2012

(65) Prior Publication Data

US 2013/0243194 A1    Sep. 19, 2013

Related U.S. Application Data (60) Provisional application No. 61/533,627, filed on Sep. 12, 2011, provisional application No. 61/535,234, filed on Sep. 15, 2011, provisional application No. 61/583,052, filed on Jan. 4, 2012, provisional application No. 61/606,794, filed on Mar. 5, 2012, provisional application No. 61/611,553, filed on Mar. 15, 2012, provisional application No. 61/645,987, filed on May 11, 2012.

(51) Int. Cl.
*H04L 29/06* (2006.01)
*H04L 9/08* (2006.01)
*H04W 12/04* (2009.01)

(52) U.S. Cl.
CPC .............. *H04W 12/04* (2013.01); *H04L 63/067* (2013.01); *H04L 9/0841* (2013.01); *H04L 9/0838* (2013.01); *H04L 2209/80* (2013.01)
USPC .......................................... 380/283; 380/270

(58) Field of Classification Search
CPC .... H04L 63/067; H04L 63/068; H04L 9/0838
USPC ................................................. 380/283, 270
See application file for complete search history.

(56) References Cited

U.S. PATENT DOCUMENTS 7,236,477 B2    6/2007 Emeott et al.
7,275,157 B2    9/2007 Winget et al.
(Continued)

FOREIGN PATENT DOCUMENTS

CN    101296081 A    10/2008
EP    1555843 A1    7/2005
WO    WO2010023506 A1    3/2010

OTHER PUBLICATIONS

Eronen, P., and H. Tschofenig. "Pre-Shared Key Ciphersuites for Transport Layer Security (TLS). Request for Comments 4279." (2010).*

(Continued)

*Primary Examiner* — Kambiz Zand
*Assistant Examiner* — Michael Guirguis
(74) *Attorney, Agent, or Firm* — S. Hossain Beladi (57) ABSTRACT

A method includes generating a shared master secret. The method also includes generating a set of shared ephemeral key data. The set of shared ephemeral key data is generated independent of the shared master secret. A validity duration of the set of shared ephemeral key data is less than a validity duration of the shared master secret. The method further includes encrypting at least one message that is to be transmitted to at least one station based on at least the shared master secret and the set of shared ephemeral key data.

34 Claims, 6 Drawing Sheets (56) References Cited

U.S. PATENT DOCUMENTS

| | | | |
|---|---|---|---|
| 7,370,350 | B1 | 5/2008 | Salowey |
| 7,395,427 | B2 | 7/2008 | Walker |
| 7,409,545 | B2 | 8/2008 | Perlman |
| 7,483,409 | B2 | 1/2009 | Zheng |
| 7,558,866 | B2 | 7/2009 | Choe et al. |
| 7,574,599 | B1 | 8/2009 | Zhang |
| 7,624,271 | B2 | 11/2009 | Sood et al. |
| 7,646,872 | B2 | 1/2010 | Brown et al. |
| 7,747,865 | B2 | 6/2010 | Krawczyk |
| 7,890,745 | B2 | 2/2011 | Qi et al. |
| 7,908,482 | B2 | 3/2011 | Lauter et al. |
| 7,983,418 | B2 | 7/2011 | Oyama et al. |
| 8,204,502 | B2 | 6/2012 | Khetawat et al. |
| 8,413,213 | B2 | 4/2013 | Glickman |
| 8,594,632 | B1 | 11/2013 | Azizi et al. |
| 2005/0066175 | A1* | 3/2005 | Perlman ................ 713/176 |
| 2005/0130659 | A1 | 6/2005 | Grech et al. |
| 2005/0251680 | A1* | 11/2005 | Brown et al. ............ 713/171 |
| 2006/0067526 | A1 | 3/2006 | Faccin et al. |
| 2006/0128362 | A1 | 6/2006 | Bae et al. |
| 2008/0201765 | A1 | 8/2008 | Walter et al. |
| 2008/0298595 | A1 | 12/2008 | Narayanan et al. |
| 2010/0232407 | A1 | 9/2010 | Navali et al. |
| 2011/0113252 | A1 | 5/2011 | Krischer et al. |
| 2011/0154039 | A1* | 6/2011 | Liu et al. ................ 713/170 |
| 2011/0296494 | A1 | 12/2011 | Muller et al. |
| 2012/0159576 | A1 | 6/2012 | Wang et al. |
| 2013/0125226 | A1 | 5/2013 | Shah et al. |
| 2013/0247150 | A1 | 9/2013 | Cherian et al. |
| 2013/0263223 | A1 | 10/2013 | Cherian et al. |
| 2014/0162606 | A1 | 6/2014 | Cherian et al. |
| 2014/0164763 | A1 | 6/2014 | Cherian et al. |

OTHER PUBLICATIONS

Cherian George (Qualcomm Inc): "Fast Re-authentication ; 11-11-1160-00-00ai-fast-re-authentication" IEEE Draft;IEEE-SA Mentor, Piscataway, NJ USA, vol. 802.11ai, Sep. 5, 2011, pp. 1-8, XP017673791, [retrieved on Sep. 5, 2011].

Csr et al., "Fast authentication in TGai," IEEE 802.11-11/1160r5, Qualcomm Allied Telsis, Jan. 2012.

Csr et al., "Fast authentication in TGai", IEEE 802.11-11/1160r6, Qualcomm Allied Telsis, Jan. 2012, 32 pages.

Eronen, P., et al., "Pre-Shared Key Ciphersuites for Transport Layer Security (TLS); rfc4279.txt", Dec. 1, 2005, XP015043208, ISSN: 0009-0003 p. 6, paragraph 3-p. 7.

International Search Report and Written Opinion—PCT/US2012/054879—ISA/EPO—Jan. 7, 2013.

Krawczyk, H., et al., "SKEME: a versatile secure key exchange mechanism for Internet", Network and Distributed System Security, 1996., Proceedings of the Sym P0sium on San Diego, CA, LISA Feb. 22-23, 1996, Los Alamitos, CA, USA, IEEE Comput. Soc, US, Feb. 22, 1996, pp. 114-127, XP010158990, DOI: 10.1109/NDSS.1996.492418 ISBN: 978-0-8186-7222-4 p. 114, paragraph 1-col. 123, paragraph 3.

Kuo, F.C., et al., "Comparison Studies between Pre-Shared and Public Key Exchange Mechanisms for Transport Layer Security", INFOCOM 2006. 25th IEEE International Conference on Computer Communications. Proceedings, IEEE, Piscataway, NJ, Apr. 1, 2006, pp. 1-6, XP031072092, DOI: 10.1109/INFOCOM.2006.115 ISBN: 978-1-4244-0221-2.

Morioka Hitoshi, "TGai Authentication Protocol Proposal ; 11-11-0976-02-00ai-tgai-authentication-protocol-proposal", IEEE Draft; IEEE-SA Mentor, Piscataway, NJ USA, vol. 802.11ai, No. 2, Jul. 21, 2011, pp. 1-24, XP017674098, [retrieved on Jul. 21, 2011].

Parikh H., et al., "Seamless Handover of Mobile Terminal from WLAN to cdma2000 Network", World Wireless Congress, XX, XX, May 30, 2003, pp. 1-6, XP002295002.

Nakhjiri M "Keying and Signaling for Wireless Access and Handover using EAP (EAP-HR)" draft-nakhjiri-hokey-hierarchy-04, Version 4, The IETF Trust, Networking Group, Apr. 5, 2007, pp. 1-23.

Park, et al., "Rapid Commit Option for the Dynamic Host Configuration Protocol version 4 (DHCPv4)", Network Working Group, Mar. 25, 2005, http://www.ietf.org/rfc/rfc4039.txt.pdf, pp. 1-10.

Barker E., et al., "Recommendation for Random Number Generation Using Deterministic Random Bit Generators", NIST Special Publication 800-90, Mar. 1, 2007, pp. 1-133, XP055042437.

Sood K, "Just-In-Time 2 Phase Association TGr Proposal for Fast BSS Transition Proposal; 11-04-1170-00-000r-just-in-time-2-phase-association-fast-bss-transition-proposal", IEEE-SA Mentor, Piscataway, NJ USA, vol. 802.11r, Oct. 15, 2004, pp. 1-60, XP017690097.

* cited by examiner

SYSTEMS AND METHODS FOR ENCODING EXCHANGES WITH A SET OF SHARED EPHEMERAL KEY DATA

CROSS REFERENCE TO RELATED APPLICATIONS

The present application claims priority from commonly owned U.S. Provisional Patent Application No. 61/533,627 filed Sep. 12, 2011, U.S. Provisional Patent Application No. 61/535,234 filed Sep. 15, 2011, U.S. Provisional Patent Application No. 61/583,052 filed Jan. 4, 2012, U.S. Provisional Patent Application No. 61/606,794 filed Mar. 5, 2012, and U.S. Provisional Patent Application No. 61/645,987 filed May 11, 2012, and U.S. Provisional Patent Application No. 61/611,553 filed Mar. 15, 2012, the contents of which are expressly incorporated herein by reference in their entirety. Moreover, the contents of the non-provisional application with the Qualcomm docket number 113346 titled: WIRELESS COMMUNICATION USING CONCURRENT RE-AUTHENTICATION AND CONNECTION SETUP, filed on Sep. 11, 2012, and the non-provisional application with Qualcomm docket number 121585, titled: SYSTEMS AND METHODS OF PERFORMING LINK SETUP AND AUTHENTICATION, filed on Sep. 11, 2012, are incorporated by reference herein.

FIELD OF THE DISCLOSURE

The present teachings relate to systems and methods for encoding exchanges with a set of shared ephemeral key data.

BACKGROUND

In Wi-Fi networking applications, security features have gradually evolved to provide more robust and better-integrated security tools. In the EAP (Extensible Authentication Protocol) standard of 802.11i, promulgated by the Institute of Electrical and Electronics Engineers (IEEE), an authentication technique including a mechanism referred to as a "4-way handshake" can be used. In the 4-way handshake mechanism, a client device such as a laptop computer, smart phone, or other client device, generally referred to as a "station," negotiates with a wireless router or other device, generally referred to as an "access point," to establish a secure networking session. During the session, the station may seek a connection to the Internet or other networks.

In the 4-way handshake approach, the station and access point exchange a series of four defined messages, based on which mutual authentication can be carried out. The access point can interact with a remote authentication dial in user service (RADIUS) server or other authentication server, a platform, or a service to establish a set of shared secrets and/or public and private keys that are used by the station and access point to execute the 4-way handshake procedure. As part of the 4-way handshake procedure, the station and access point can access a shared secret, which can include a pair-wise master key (PMK). Messages exchanged between the station and the access point can be encoded using further sets of public and private keys, including a transient pairwise key (PTK), which can be constructed using the pair-wise master key as a generator for further encryption key layers.

However, in existing 4-way handshake embodiments, an attacker who is able to successfully intercept and decode the pair-wise master key may then be able to use that higher-level key to generate and possibly intercept and decode traffic between the access point and one or more stations by generating or deducing the respective pair-wise transient keys or other cipher information, because once a pair-wise master key is established, the additional session keys derived from that pair-wise master key remain valid and operable for as long a time as the original pair-wise master key remains valid. As a result, a successful attacker who captures the pair-wise master key may be able to decrypt the streams between the access point and any one or more stations that communicate with the access point during the effective lifetime of the pair-wise master key.

SUMMARY

Systems and methods of providing perfect forward secrecy in Wi-Fi network sessions are disclosed. Perfect forward secrecy (PFS) is an approach to security. PFS may refer to a property of a key derivation such that if a parent secret is exposed by an attacker, then the attacker may not determine past or future keys derived from the parent secret.

When a client device is performing a 4-way handshake with an access point (AP), a pair-wise master key (PMK) is generated and additional keys, such as a pair-wise transient key (PTK), are derived from the PMK. The PTK remains valid for as long as the PMK remains valid; thus, without added security (such as PFS), an attacker may derive the PTK from a compromised PMK to decode transmissions between the client device and the AP during an effective lifetime of the compromised PMK. Instead of relying on derived keys that may remain valid for as long as the PMK may remain valid, the described techniques provide enhanced security by implementing PFS in the 4-way handshake.

When the client device performs the 4-way handshake with the AP, the AP may generate and transmit an access point nonce (Anonce) message to the client device. The client device may obtain a PMK and generate a station nonce (Snonce) message. The client may derive a PTK, a key confirmation key (KCK), and a key encryption key (KEK) based on the PMK, the Anonce, Snonce, and/or other information.

To implement PFS in the 4-way handshake, the client device may transmit an association request that may include a station (STA) Diffie-Hellman ephemeral public key (SDHEPubKey) to the AP. The AP may obtain the PMK and derive the PTK from the PMK.

To implement PFS in the 4-way handshake, the AP may derive a shared Diffie-Hellman ephemeral key (SharedDHEKey) from the SDHEPubKey and an access point Diffie-Hellman ephemeral private key (ADHEPrivKey) that is known to the AP. The SDHEPubKey and the ADHEPrivKey may be pre-generated by the client device and the AP prior to engaging in the 4-way handshake, respectively. Furthermore, the AP may derive a perfect forward secrecy-pairwise transient key (PFS-PTK), a perfect forward secrecy-key confirmation key (PFS-KCK), and a perfect forward secrecy-key encryption key (PFS-KEK) based on the SharedDHEKey and the PTK. The AP may transmit an access point Diffie-Hellman ephemeral public key (ADHEPubKey) to the client device. The client device may derive the SharedDHEKey based on a station Diffie-Hellman ephemeral private key (SDHEPrivKey) that is known to the client device and the ADHEPubKey. The ADHEPubKey and the SDHEPrivKey may be pre-generated by the AP and the client device prior to engaging in the 4-way handshake, respectively. The client device may derive the PFS-PTK, the PFS-KCK, and the PFS-KEK based on the PTK and the SharedDHEKey.

The AP and the client device may delete the ADHEPrivKey and the SDHEPrivKey after deriving the SharedDHEKey, respectively. The client device and the AP may decrypt respective received transmissions based on the PFS-KEK, the PFS-KCK, the SharedDHEKey, and/or another key derived from the PMK.

In a particular embodiment, a method includes generating a shared master secret. The method also includes generating a set of shared ephemeral key data. The set of shared ephemeral key data is generated independent of the shared master secret. A validity duration of the set of shared ephemeral key data is less than a validity duration of the shared master secret. The method further includes encrypting at least one message that is to be transmitted to at least one station based on at least the shared master secret and the set of shared ephemeral key data.

In another particular embodiment, an apparatus includes a wireless network interface to at least one station. The apparatus also includes a processor configured to communicate with the at least one station via the network interface. The processor is configured to generate a shared master secret and to generate a set of shared ephemeral key data. The set of ephemeral key data is generated independent of the shared master secret. A validity duration of the set of shared ephemeral key data is less than a validity duration of the shared master secret. The processor is further configured to encrypt at least one message that is to be transmitted to the at least one station using at least the shared master secret and the set of shared ephemeral key data.

One particular advantage provided by at least one of the disclosed embodiments is an ability of a first device (e.g., a mobile station) to implement PFS with a second device (e.g., an access point) in a Wi-Fi network.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Embodiments of the present teachings relate to systems and methods for providing perfect forward secrecy in Wi-Fi network sessions. More particularly, embodiments relate to platforms and techniques for inserting mechanisms to create or allow perfect forward secrecy (PFS) to be applied to Wi-Fi sessions which use the 4-way handshake to establish communications between an access point and a station. The access point and the station can carry out a 4-way handshake operation, using a pair-wise master key, an authentication server, a message integrity check (MIC), and other procedures and resources specified by the 802.11i standard, and/or other protocols. In systems and methods for providing perfect forward secrecy in Wi-Fi network sessions, the access point and the station can apply further layers of cryptographic protection, including the generation of an additional set of ad hoc keys that are inserted into the 4-way handshake structure. The additional set of ad hoc keys can include a set of public and private key data that is generated using Diffie-Hellman (DH) calculations, which can be or include the generation of public and private key pairs using finite field, elliptical, and/or other arithmetic. The Diffie-Hellman keys and related information can be generated based upon or using randomized number generators.

After the corresponding Diffie-Hellman shared keys are generated and/or retrieved on both the access point side and the station side, the private portion of that Diffie-Hellman shared key can be deleted or destroyed by both the access point and the station units. Since those private keys (e.g., the ADHEPrivKey and the SDHEPrivKey) have been deleted or destroyed, an attacker who captures the message streams between the access point and the station cannot compromise other streams before or after a current session, even if the attacker later manages to recover the pair-wise master key used during the current session. The attacker cannot compromise other streams because separate sessions that are encoded according to systems and methods for providing perfect forward secrecy in Wi-Fi network sessions will have different Diffie-Hellman key data, separately generated during each session, whose decoding would require the acquisition of other Diffie-Hellman private and public key information. According to these and other aspects, security of Wi-Fi sessions can be enhanced, and perfect forward secrecy (PFS) can be incorporated into the 4-way handshake security scheme.

In a particular embodiment, a method includes generating a shared master secret. The method also includes generating a set of shared ephemeral key data to encode exchanges associated with an access point and at least one station, where the set of shared ephemeral key data is based on content of a handshake exchange associated with the access point and the at least one station performed to authenticate communications associated with the access point and the at least one station. The set of shared ephemeral key data is generated independent of the shared master secret and a validity duration of the set of shared ephemeral key data is less than a validity duration of the shared master secret. The method further includes encoding at least one message based on at least the shared master secret and the set of shared ephemeral key data.

In another particular embodiment, an apparatus includes a wireless network interface to at least one station. The apparatus also includes a processor configured to communicate with the at least one station via a network interface, the processor being configured to generate a shared master secret and to generate a set of shared ephemeral key data to encode exchanges associated with an access point system and the at least one station. The set of shared ephemeral key data is based on content of a handshake exchange associated with the access point system and the at least one station performed to authenticate communications associated with the access point system and the at least one station. The set of ephemeral key data is generated independently of the shared master secret and a validity duration of the set of shared ephemeral key data is less than a validity duration of the shared master secret. The processor is further configured to encode at least one message associated with the access point system and the at least one station using at least the shared master secret and the set of shared ephemeral key data.

Reference is made to exemplary embodiments of the present teachings, which are illustrated in the accompanying drawings. Where possible the same reference numbers are used throughout the drawings to refer to the same or like parts.

Figure 1:
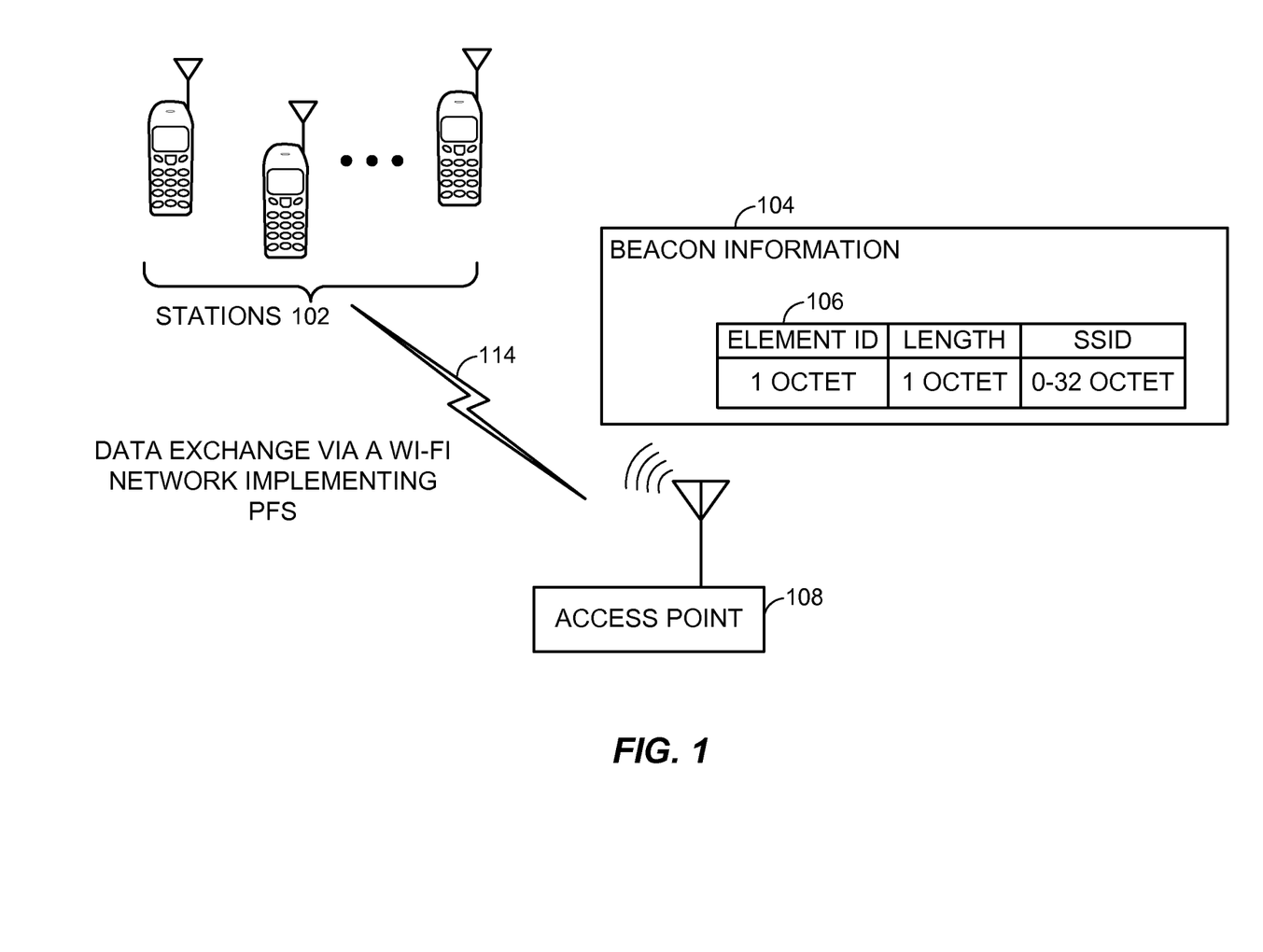
FIG. 1 illustrates an overall network which can be used in systems and methods for providing perfect forward secrecy in Wi-Fi network sessions, according to various embodiments.

FIG. 1 illustrates an overall network 100 in which systems and methods for providing perfect forward secrecy in Wi-Fi network sessions can operate. As shown, an access point 108 can broadcast a wireless network signal to a set of stations 102 within range. The access point 108 can include a wireless router and/or other network access point and can be configured to operate using the Wi-Fi wireless standard, specified by IEEE specification 802.11b, 802.11g, 802.11n, and/or other standards. When operating as a Wi-Fi access point, the access point 108 can for instance operate in the 2.4 GHz frequency band. It will be appreciated however that in other embodiments, other wireless access standards, channels, and/or or frequencies can be used. As is described in more detail below, at least one of the set of stations 102 may engage in a data exchange 114 that implements perfect forward secrecy (PFS) with the access point 108 via a Wi-Fi network.

Figure 2:
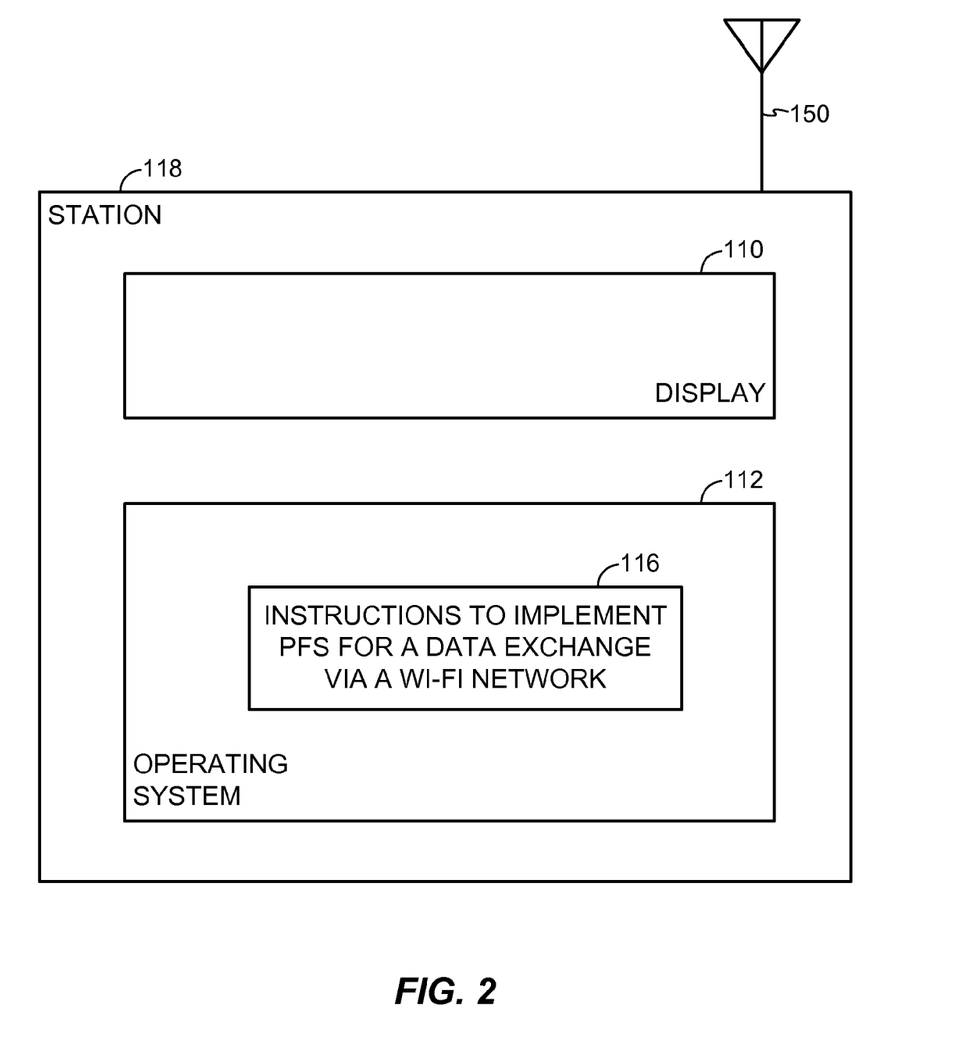
FIG. 2 illustrates hardware, software, and other resources that can be used in an access point that can be configured to use systems and methods for providing perfect forward secrecy in Wi-Fi network sessions, according to various embodiments.

Each device or station in the set of stations 102 can include any wireless-network enabled device, such as a Wi-Fi-equipped smart phone, a touch pad device, and/or another device or platform. As shown in FIG. 2, an individual station 118 in the set of stations 102 can be configured with one or more hardware, software, and/or other resources. A station 118 can comprise various hardware, software, and other resources, including an operating system 112, a display 110 which can for instance display a graphical user interface (GUI) of the operating system 112, and a radio frequency antenna 150 (or multiple antennas). The operating system 112 can comprise a mobile device operating system such as the Android™ operating system available from Google Inc., Mountain View, Calif., U.S., or others. The operating system 112 as noted can comprise a graphical user interface (GUI), as well as file management, power management, communications, and/or other logic, services, and/or resources to operate the station 118. The operating system 112 may include computer instructions 116. The computer instructions 116 may cause a processor to implement PFS for data exchanges via a Wi-Fi network. The station 118 can host applications, services, logic, and/or other logic, services, and/or modules, which can be used to establish connections to access points and/or other channels. Any one or more of the set of stations 102 can be connected to the access point 108 at one time. As shown in FIG. 2, the access point 108 can broadcast beacon information 104 to the set of stations 102. The beacon information 104 can include a service set identification (SSID) information element (IE) indicating the name, connection type, available channels, and other network information and services provided by the access point 108 to any station within its wireless connection range. FIG. 3 illustrates a call sequence that can be used to establish a connection in accordance with the Wi-Fi standard with enhancements, features, extensions and/or advantages according to systems and methods for providing perfect forward secrecy in Wi-Fi network sessions, including the provisioning of perfect forward secrecy (PFS) in individual networking sessions. In general terms, the call flow sequence can be carried out between two or more platforms, systems, nodes, devices, and/or other hardware, including, as illustrated, the station 120, the first access point 122, the second access point 124, an authentication server 126, and a dynamic host configuration protocol (DHCP) server 128. While those individual platforms, systems, nodes, devices, and/or hardware are illustrated, it will be appreciated that in other embodiments, alternative or additional hardware platforms, systems, nodes, devices, and/or hardware can be used. As shown at 0002, a station 120 can approach and enter the wireless range of a first access point 122 (labeled AP1), such as a Wi-Fi wireless router, and/or other access device, platform, or site. At 1002, the station 120 can move out of range of the first access point 122 and into the wireless range of the second access point 124 (labeled AP2). The second access point 124 can likewise include a Wi-Fi wireless router and/or another access device or site. At 2002, the second access point 124 can generate an access point nonce (Anonce) message, which can include a one-time message, a string, data, and/or a code to announce the presence of the second access point 124 and may be used in the generation of key codes. The access point nonce (Anonce) can include a randomly or pseudo-randomly generated number and/or other data. The access point nonce (Anonce) message can be inserted into the beacon message broadcast by the second access point 124.

Figure 3A:
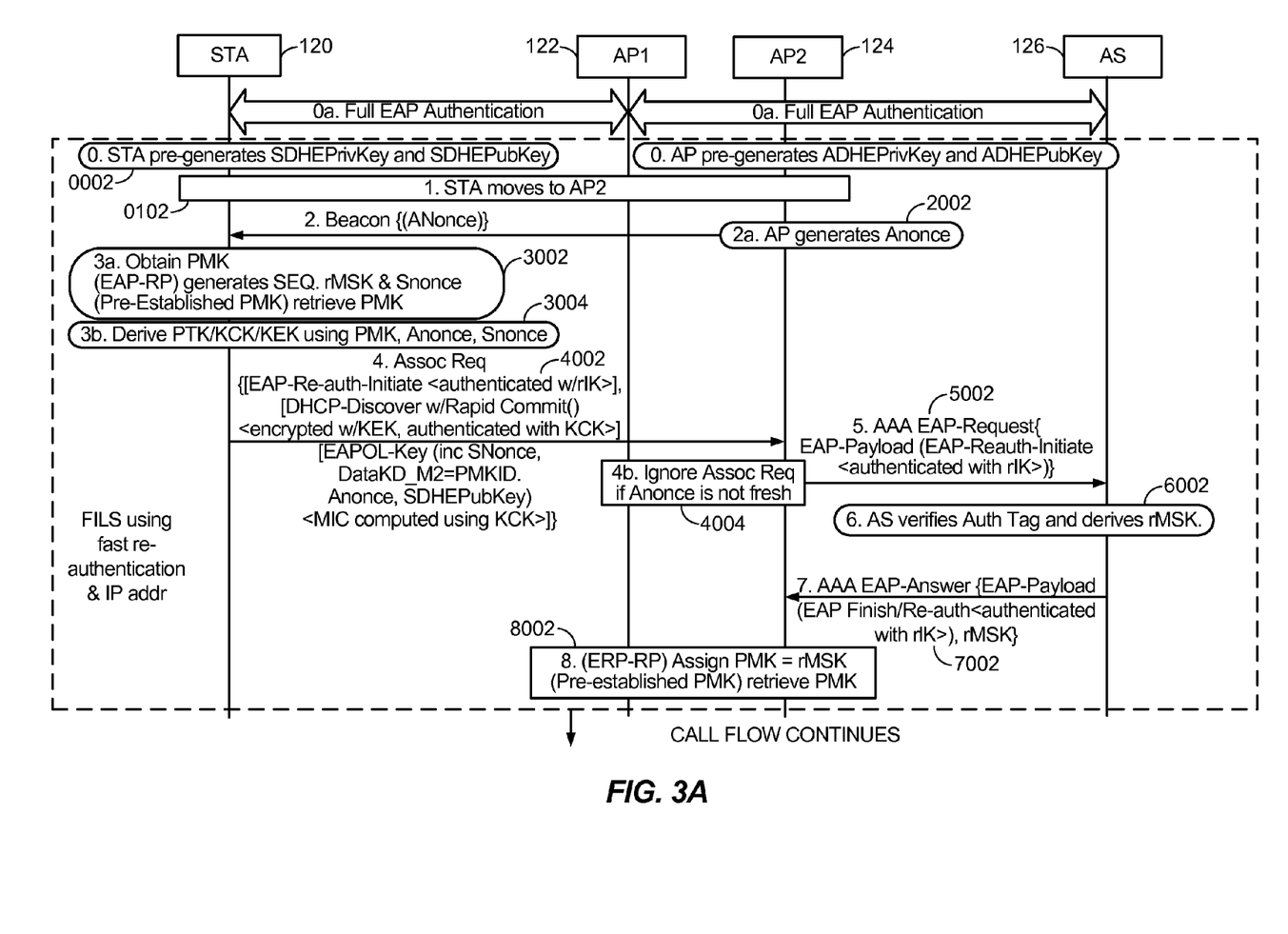
FIGS. 3A and 3B illustrate an exemplary call flow sequence to execute the configuration and operation of an encryption arrangement between an access point and a station, according to various embodiments of the present teachings.

At 3002, the station 120 can obtain a pairwise master key (PMK) to be used to establish secure communication with the second access point 124. To obtain the PMK, the station 120 can generate information including, for instance, an SEQ message or data, an rMSK message or data, and a station nonce (Snonce) message or data. If a pre-established pairwise master key is used, the station 120 can retrieve that pair-wise master key. At 3004, the station 120 can derive additional information including, for instance, a pair-wise transient key (PTK), an extensive authentication protocol over LAN (EAPOL)-key confirmation key (KCK), and an EAPOL-key encryption key (KEK) using the pair-wise master key, an access point nonce (Anonce), a station nonce (Snonce), and/or other information.

At 4002, the station 120 can generate an association request (Assoc Req) and transmit that request to the second access point 124. In connection with the request, the station 120 can perform computations to generate additional keys and related data, including a Diffie-Hellman ephemeral private key (SDHEPrivKey) and a Diffie-Hellman ephemeral public key (SDHEPubKey). The station Diffie-Hellman ephemeral private key (SDHEPrivKey) and the station Diffie-Hellman ephemeral public key (SDHEPubKey) can be generated using Diffie-Hellman cryptographic approaches, which can include elliptical or other arithmetic.

It may be noted that one or both of the station 120 and the second access point 124 can access, store, and/or pre-compute the same Diffie-Hellman data and retrieve that data when required, which can reduce the computational burden during execution of the modified 4-way handshake protocol. The station Diffie-Hellman ephemeral public key (SDHEPubKey) can be incorporated in the parameters or fields of the association request (Assoc Req) and may be sent to the second access point 124. At 4004, the second access point 124 can receive the association request (Assoc Req) but can ignore that request if the Access Point nonce (Anonce) message is not current, valid, or fresh.

At 5002, the second access point 124 can transmit an AAA EAP-Request to the authentication server 126. As illustrated, the AAA EAP-Request can include a number of parameters or fields, some or all of which can be used to authenticate the station 120 and/or data or credentials associated with the station 120. At 6002, the authentication server 126 can verify the authentication tag (Auth Tag) and derive the rMSK key or data. At 7002, the authentication server 126 can transmit an AAA EAP-Answer to the second access point 124, which answer can include a number of parameters or fields, as illustrated. At 8002, the second access point 124 can assign the pair-wise master key to equal the rMSK returned in the AAA EAP-Answer. In other embodiments using a stored pair-wise master key, the second access point 124 can instead retrieve the pair-wise master key from storage.

Figure 3B:
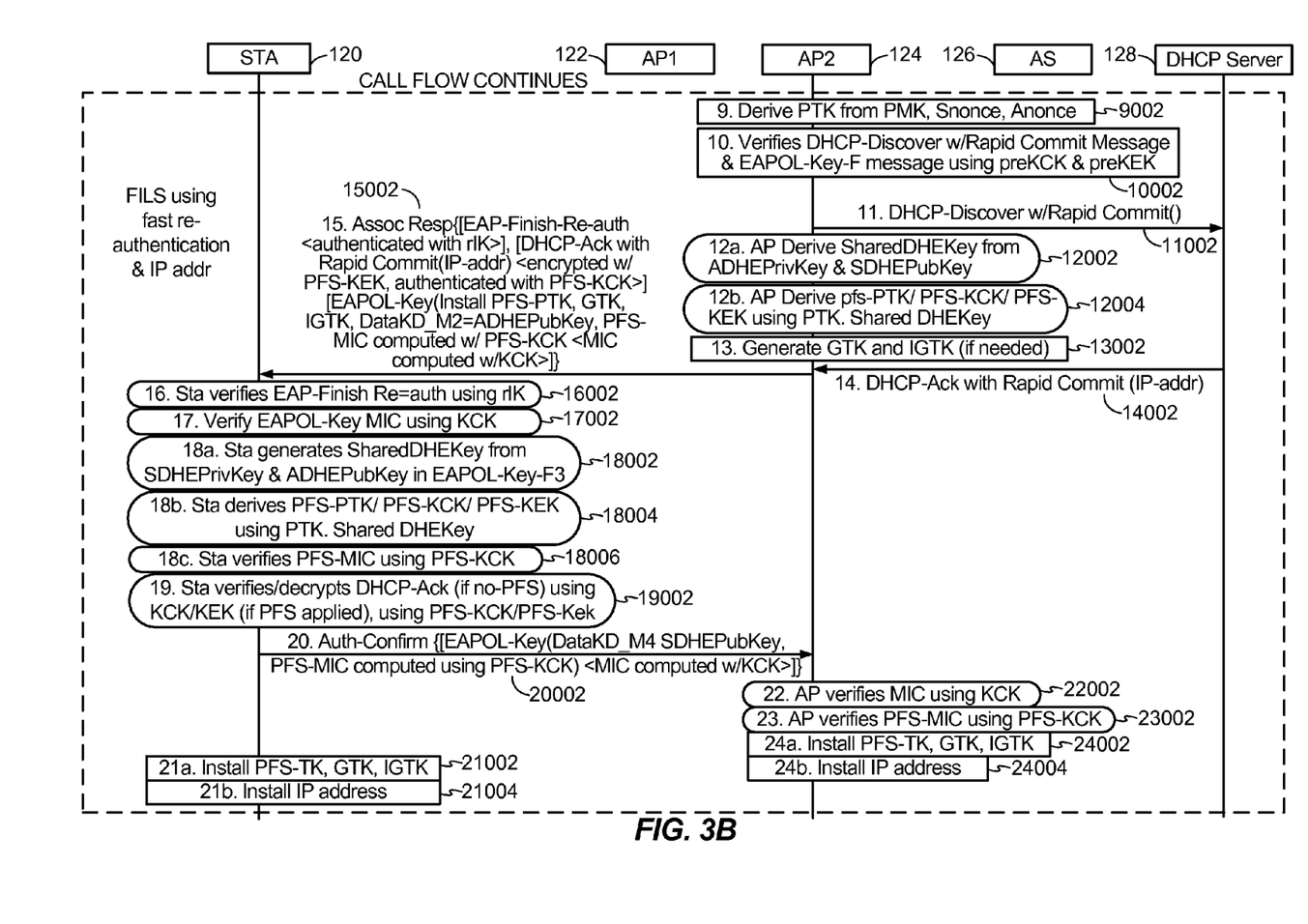

At 9002, the second access point 124 can derive a pair-wise transient key (PTK) from the pair-wise master key, the station nonce (Snonce), and the access point nonce (Anonce). At 10002, the second access point 124 can verify the DHCP-Discover with Rapid Commit message and the EAPOL-Key_F message using KCK and KEK data, and/or other information. At 11002, the second access point 124 can transmit a DHCP-Discover with Rapid Commit( ) message to the DHCP server 128. At 12002, the second access point 124 can derive an ad hoc, or shared Diffie-Hellman ephemeral key (SharedDHEKey) from the ADHEPivKey and the SDHEPubKey, and/or other information or data. At 12004, the second access point 124 can derive the perfect forward secrecy-pair-wise transient key (PFS-PTK), as well as other information or data including a perfect forward secrecy key confirmation key (PFS-KCK) and perfect forward secrecy-EAPOL-key encryption key (PFS-KEK) using the pair-wise transient key, the shared Diffie-Hellman ephemeral key (SharedDHEKey), and/or other information.

At 13002, the second access point 124 can generate a group temporal key (GTK) and integrity group temporal key (IGTK), as needed. It may be noted that, after generating the shared Diffie-Hellman ephemeral key (SharedDHEKey), and/or at other times, the station 120 and the second access point 124 can respectively delete, discard, overwrite, and/or otherwise wipe out or destroy their respective Diffie-Hellman ephemeral private keys (that is, the corresponding SDHEPrivKey and ADHEPrivKey). By deleting, overwriting, and/or otherwise wiping out or destroying the Diffie-Hellman ephemeral private keys belonging to the station 120 and the second access point 124, the station 120 and the second access point 124 can ensure that no attacker can compromise stored message traffic. This is the case even if the attacker gains possession of the pair-wise master key and unaltered pair-wise transient key, since the shared Diffie-Hellman ephemeral key (SharedDHEKey) would still be required to decrypt that traffic, but the shared Diffie-Hellman ephemeral key (SharedDHEKey) is unrecoverable once the respective private Diffie-Hellman keys (SDHEPrivKey and ADHEPrivKey) are deleted. At 14002, the DHCP server 128 can generate a DHCP-Ack with Rapid Commit (IP-addr) message, and transmit that message to the second access point 124. That message can include an assigned IP address for the station 120. It may be noted that while 11002 through 14002 are illustrated as taking place in a certain order, those processing steps, message, decision logic, and/or other actions, as well as others shown in FIGS. 3A and 3B and elsewhere, can take place in various other sequences or orders, depending on the configuration of the station 120 and the second access point 124, and/or other factors.

At 15002, the second access point 124 can form an association response (Assoc Resp) with various fields or components. The various fields or components can include a message related to EAP authentication, namely an EAP-Finish message or data received from the Authentication Server at 7002. The EAP-Finish message or data can be an EAP-Finish Re-Auth message or data. The Assoc Response can also include a message related to DHCP with various options, which can as illustrated consist of an DHCP-Ack with Rapid Commit message or data, and/or other messages or data received from the DHCP Server at 14002. The AP2 can apply encryption and/or integrity protection to these messages or data. The encryption can use KEK or PFS-KEK or another key derived from PMK and/or PTK and/or SharedDHEKey. The integrity protection can use KCK or PFS-KCK or another key derived from PMK and/or PTK and/or SharedDHEKey. The Assoc Response can further include a message related to an EAPOL-key message, which can as illustrated include options for encryption, authentication, and/or integrity checking using the perfect forward secrecy-pair-wise transient key (PFS-PTK) and/or other keys or data. This EAPOL-key-related message can include ADHEPubKey. This EAPOL-key-related message can include a message integrity check (MIC) computed over the EAPOL-key-related message or data using KCK. The AP2 122 can compute a perfect forward secrecy-message integrity check (PFS-MIC) using PFS KCK and/or other data, message, or information. The PFS-MIC can provide integrity protection of all or a portion of the combination of the Assoc Req 4002 and Assoc Resp 15002. The integrity-protected portion can correspond to the EAPOL-Key-related message or data in the Assoc Resp 15002. The PFS-MIC can be transmitted internal to the EAP-Finish Re-Auth or DHCP or EAPOL-Key-related messages or data. The PFS-MIC can be part of the Assoc Resp, but outside the EAP-Finish Re-Auth or DHCP or EAPOL-Key-related messages or data.

At 16002, the station 120 can verify the EAP-Finish Re-Auth message using rIK and/or other information. At 17002, the station 120 can verify the EAPOL-Key message integrity check (MIC) using the KCK. In 18002, the station 120 can generate a shared Diffie-Hellman Ephemeral key (SharedDHEKey) from the SDHEPrivKey and the ADHEPubKey located in the EAPOL-Key message as generated or presented at 15002, and/or other data or information. At 18004, the station 120 can derive the PFS-PTK, the PFS-KCK, and the PFS-KEK information using the pair-wise transient key and the shared Diffie-Hellman ephemeral key (SharedDHEKey), and/or other data or information. At 18006, the station 120 can verify the PFS-MIC using the PFS-KCK, and/or other data, message, or information.

At 19002, the station 120 can verify and/or decrypt the DHCP-Ack message. The decryption can use KEK or PFS-KEK or another key derived from PMK and/or PTK and/or SharedDHEKey. The verification can use KCK or PFS-KCK or another key derived from PMK and/or PTK and/or SharedDHEKey. In 20002, the station 120 can transmit an Authorization Confirmation (Auth-Confirm) message to the second access point 124, including a set of parameters or fields, as illustrated. The Auth-Confim message can include a message or data related to an EAPOL-key message. This EAPOL-key-related message or data can include a message integrity check (MIC) computed over the EAPOL-key-related message or data using KCK. When using perfect forward secrecy (PFS) according to the present teachings, the perfect forward secrecy-message integrity check (PFS-MIC) can be incorporated in the Authorization (Auth-Confirm) message. The PFS-MIC can be computed using PFS KCK and/or other data, message, or information. The PFS-MIC can provide integrity protection of all or a portion of the combination of the Assoc Req 4002 and Assoc Resp 15002 and Auth-Confirm 20002. The integrity-protected portion can correspond to the EAPOL-Key-related message or data in the Auth Confirm 20002. The PFS-MIC can be internal to the EAP-Finish Re-Auth or DHCP or EAPOL-Key-related messages or data. The PFS-MIC can be part of the Auth-Confirm, but outside the EAP-Finish Re-Auth or DHCP or EAPOL-Key-related messages or data.

At 21002, the station 120 can install keys or data including the PFS-TK, GTK, and IGTK. At 21004, the station 120 can install the IP (Internet Protocol) address generated by the dynamic host configuration protocol (DHCP) 128 through the authentication process.

At 22002, the second access point 124 can verify the message integrity check (MIC) using the key confirmation key (KCK). At 2302, the second access point 124 can verify the PFS-MIC using the PFS-KCK data, and/or other data, message, or information. At 2402, the second access point 124 can install keys or data including the PFS-TK, GTK, and IGTK. At 24004, the second access point 124 can install the IP (Internet Protocol) address for the station 120. After 24004, the station 120 can access the Internet and/or other public or private networks through the second access point 124, using the assigned IP (Internet Protocol) address. It may be noted that while the encryption and related processing shown in FIGS. 3A and 3B illustrate exchanges between the station 120 and the second access point 124 toward which the station 120 is traveling, the same or similar processing can be applied between the station 120 and the first access point 122, the station 120 and a third access point (not shown), and/or other network configurations.

It may likewise be noted that after completion of the enhanced authentication process illustrated in FIG. 2, the session conducted between the station 120 and the second access point 124 is protected by the pair-wise master key (PMK), the pair-wise transient key (PTK), and/or other security features of the extensible authentication protocol (EAP), including the 4-way handshake. However, according to aspects of the present teachings, the addition of features related to perfect forward secrecy (PFS) and the use of public/private key sets based on Diffie-Hellman generators permits increased security compared to a "bare" 4-way handshake protocol. According to aspects of the present teachings, an attacker who captures and stores message streams between the station 120 and the second access point 124 (or any comparable access point), including the pair-wise master key (PMK) and pair-wise transient key (PTK), still cannot breach the integrity of those streams, since the re-creation of the shared Diffie-Hellman ephemeral key (SharedDHEKey) needed to complete the breach is not possible without the private Diffie-Hellman ephemeral keys belonging to the station (SDHEPrivKey) and/or access point (ADHEPrivKey), which have been discarded in relatively short order after establishing the session.

Security processing according to systems and methods for providing perfect forward secrecy in Wi-Fi network sessions can be implemented in various networking environments, including, for example, a Wi-Fi networking environment in which Fast Initial Link Setup (FILS) capability is incorporated. Fast Initial Link Setup (FILS) comprises a set of communication protocols promulgated by the Institute of Electrical and Electronics Engineers (IEEE) standard 802.11ai, which is intended to address scenarios where the approach and registration of a station to an access point takes place in a transient manner, such as a smart phone or wireless-enabled laptop computer passing through a public airport, bus terminal, and/or other environment, where the speed with which wireless connections can be established is at a premium. It will be appreciated, however, that platforms and techniques according to the present teachings can be integrated into other network configurations, whether using the Fast Initial Link Setup (FILS) protocol, or not.

According to aspects of the present teachings in further regards, the station 120 and the second access point 124 (or other access point or node) can each store the shared Diffie-Hellman ephemeral key (SharedDHEKey) generated during a session, for re-used during a later, second session between the same two devices. When the shared Diffie-Hellman ephemeral key (SharedDHEKey) is retrieved rather than generated, a significant amount of computation can be saved on both ends. According to such embodiments, each of the station 120 and the second access point 124 (or other access point or node) can for instance associate an identifier with the shared Diffie-Hellman ephemeral key (SharedDHEKey), for example by generating a hash function output based on one or both of their respective public Diffie-Hellman ephemeral keys (SDHEPubKey and ADHEPubKey), or otherwise. In additional embodiments, the station 120 and the access point 124 need not create an explicit identifier for the shared Diffie-Hellman ephemeral key (SharedDHEKey), but can instead be configured to automatically associate and retrieve that key when the same station or access point as in a previous session is encountered or identified.

Figure 4:
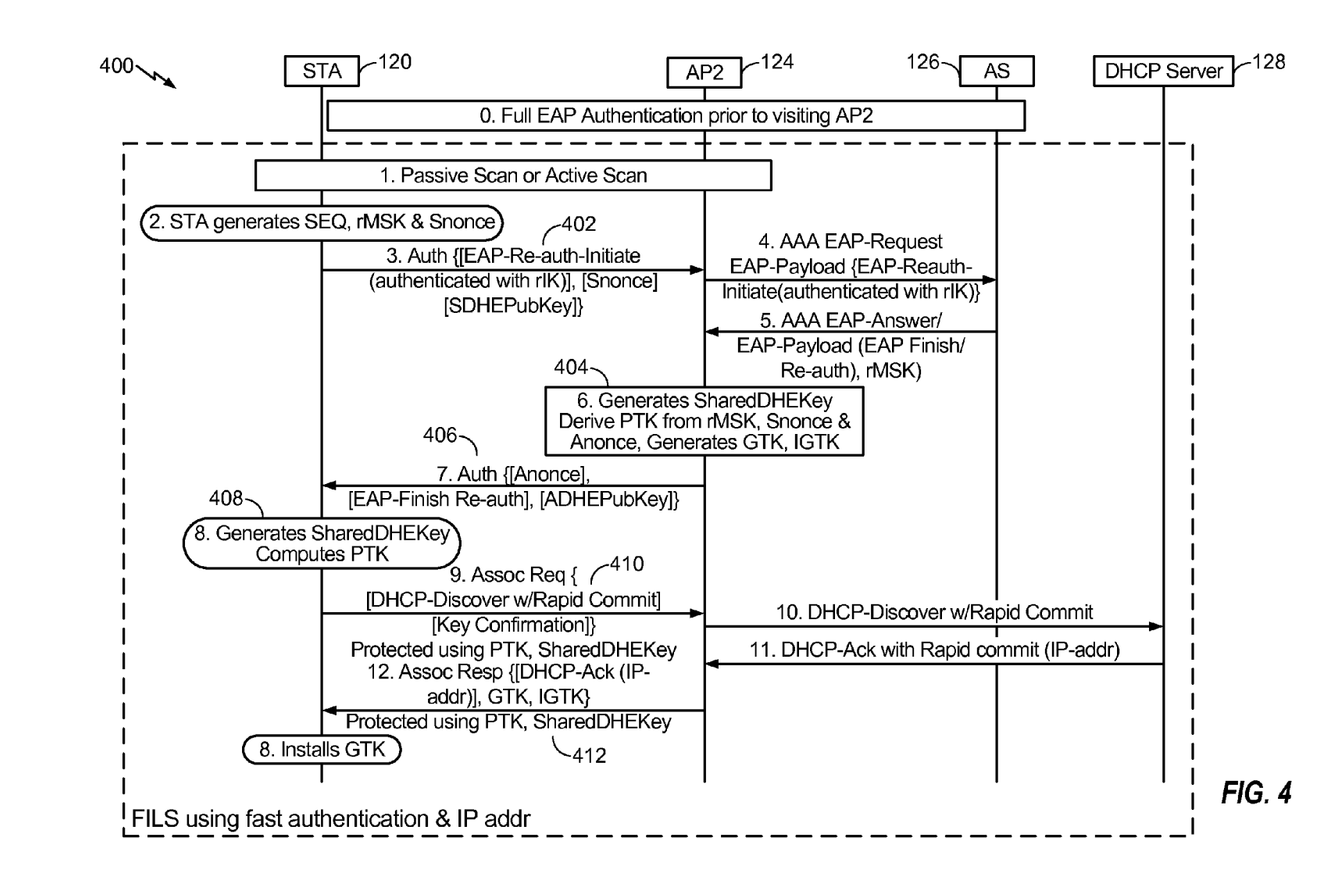
FIG. 4 illustrates another exemplary call flow sequence to execute the configuration and operation of an encryption arrangement between an access point and a station, according to various embodiments of the present teachings.

FIG. 4 illustrates a particular call flow sequence to execute a configuration and operation of the encryption arrangement of FIG. 3A and 3B with a delayed Anonce, and is generally designated 400.

For example, instead of transmitting the Anonce from the second access point 124 via the beacon message to the station 120 as in FIG. 3A, the second access point 124 may transmit the Anonce in a different message. In a particular embodiment, the second access point 124 transmits the Anonce after generating the PTK at the second access point 124. To illustrate, prior to transmitting the Anonce to the station 120, the second access point 124 may receive an authorization message from the station 120, at 402. The authorization message may include the Snonce, the SDHEPubKey, and the EAP-Re-auth-initiate message. The second access point 124 may generate the SharedDHEKey and derive the PTK from the rMSK, the Snonce, and the Anonce, at 404. Furthermore, the second station 124 may also generate the GTK and the IGTK, at 404.

The second access point 124 may transmit the Anonce to the station 120 in an authorization reply message, at 406. The authorization reply message may include the Anonce, the EAP-Finish Re-auth information element, and the ADHEPubKey. The station 120 may generate the SharedDHEKey and the PTK after receiving the authorization reply message, at 408. The station 120 may transmit an association request to the second access point 124, at 410. The association request may include the DHCP-Discover with Rapid Commit message and a key confirmation. The second access point 124 may transmit an association response to the station 120, at 412. The association response may include the DHCP-Ack with Rapid Commit (IP-addr) message, the GTK, and the IGTK.

Figure 5:
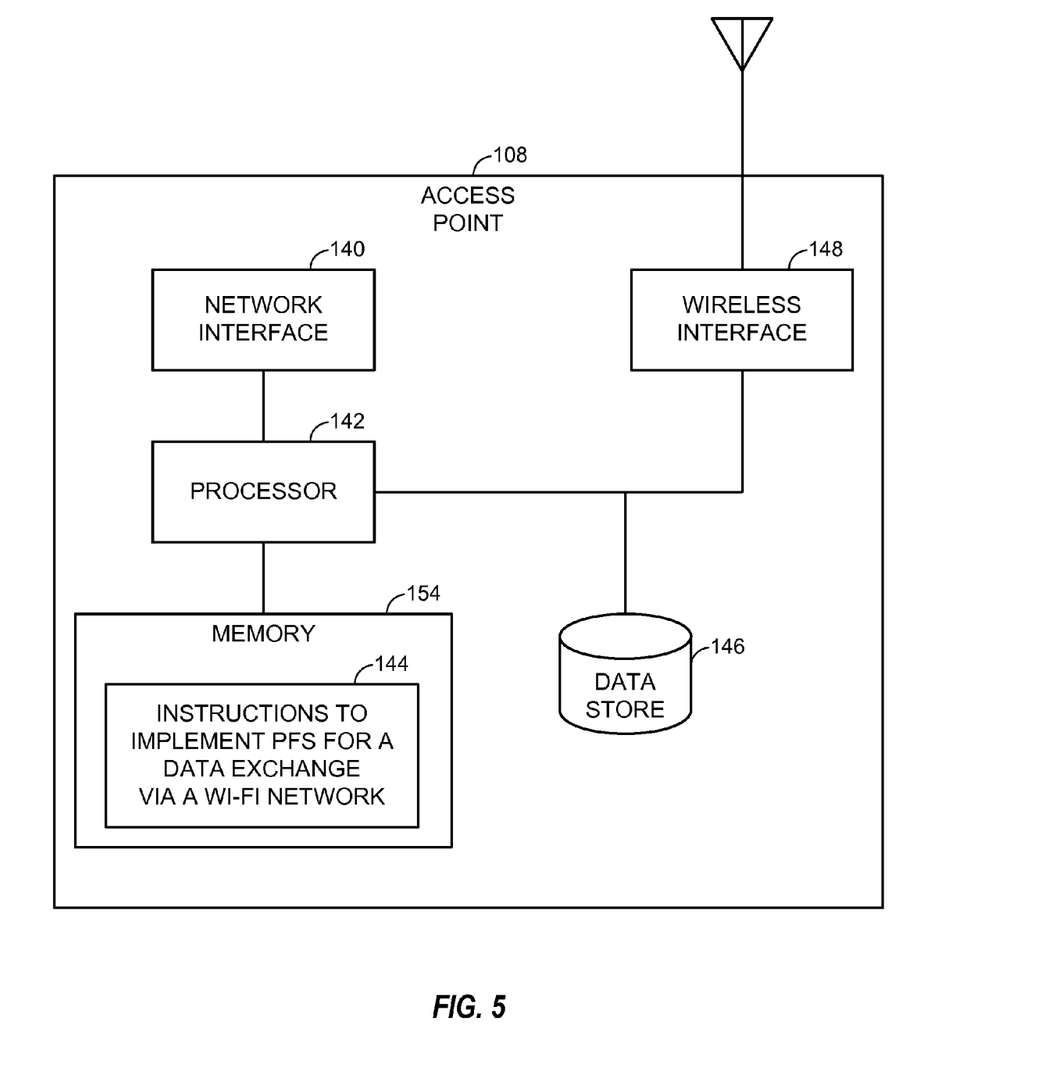
FIG. 5 illustrates exemplary hardware, software, and other resources that can be used in providing perfect forward secrecy in Wi-Fi network sessions, according to various embodiments.

FIG. 5 illustrates various hardware, software, and other resources that can be used in embodiments of providing perfect forward secrecy in Wi-Fi network sessions, according to embodiments. In embodiments as shown, the access point 108 can comprise features of a processor 142 communicating with memory 144, such as electronic random access memory, as well as with a network interface, such as an Ethernet and/or other wired or wireless connection to the Internet and/or other networks. The processor 140 can be programmed or configured to carry out character set encoding operations, network connectivity operations, and other operations according to the present teachings. The processor 140 can also communicate with a local data store 146, such as a local hard disk and/or other storage, as well as to a wireless interface 148, such as a Wi-Fi-compatible chipset, including radio frequency chip set(s) and associated hardware and software, which may be connected to a radio frequency antenna 152 (or multiple antennas). The memory 144 may include instructions 154. The instructions 154 may cause a processor (e.g., the processor 140) to implement PFS for a data exchange via a Wi-Fi network.

In conjunction with the described embodiments, an apparatus may include means for communicating with at least one station via a wireless network interface. For example, the means for communicating may include one or more components (e.g., a transmitter, a receiver, an antenna) of the station 102 of FIG. 1, one or more components (e.g., a transmitter, a receiver, an antenna) of the access point 108 of FIG. 1, the radio frequency antenna 150 of FIG. 2, one or more components (e.g., a transmitter, a receiver, an antenna) of the station 120 of FIGS. 3A, 3B, and 4, one or more components (e.g., a transmitter, a receiver, an antenna) of the first access point 120 of FIGS. 3A, 3B, and 4, one or more components (e.g., a transmitter, a receiver, an antenna) of the second access point 124 of FIGS. 3A, 3B, and 4, the wireless interface 148 of FIG. 5, the radio frequency antenna 152 of FIG. 5, one or more other devices configured to wirelessly communicate data, or any combination thereof. The apparatus may also include means for processing, the means for processing configured to generate a shared master secret and generate a set of shared ephemeral key data. The set of shared ephemeral key data is generated independent of the shared master. A validity duration of the set of shared ephemeral key data is less than a validity duration of the shared master secret. The means for processing is also configured to encrypt at least one message that is to be transmitted to the at least one station based on at least the shared master secret and the set of shared ephemeral key data. For example, the means for processing may include one or more components (e.g., a processor) of the station 102 of FIG. 1, one or more components (e.g., a processor) of the access point 108 of FIG. 1, the operating system 112 and the instructions 116 of FIG. 2, one or more components (e.g., a processor) of the station 120 of FIGS. 3A, 3B, and 4, one or more components (e.g., a processor) of the first access point 120 of FIGS. 3A, 3B, and 4, one or more components (e.g., a processor) of the second access point 124 of FIGS. 3A, 3B, and 4, the processor 142 and the instructions 154 of FIG. 5, one or more other devices configured to process data, or any combination thereof.

The foregoing description is illustrative, and variations in configuration and implementation may occur to persons skilled in the art. For example, while embodiments have been described and illustrated in which the station 120 approaches the second access point 124 for registration and the application of perfect forward secrecy (PFS), in other embodiments, it is possible to have multiple stations connected to one access point, for instance using a group master key, a group shared Diffie-Hellman ephemeral key (DHESharedKey), and/or other keys or data. Alternatively, in other embodiments, each station that approaches and registers to an access point can exchange separate ad hoc, or shared Diffie-Hellman ephemeral keys (DHESharedKeys), with the station, individually.

While embodiments have been described and illustrated in which perfect forward secrecy (PFS) can be employed in networking scenarios which also employ the fast initial link setup (FILS) standard under IEEE 802.11ai, perfect forward secrecy (PFS) according to the present teachings can be applied in environments which do not incorporate fast initial link setup (FILS). Similarly, while embodiments have been described in which one authentication server 126 operates to support the provisioning of keys and establishing encrypted message streams, in other embodiments, multiple authentication servers and/or services can be used. Other resources described as singular or integrated can in other embodiments be plural or distributed, and resources described as multiple or distributed can in other embodiments be combined. Further, while embodiments have been described as operating in Wi-Fi networks which are configured in an access point/station arrangement, in other embodiments, the teachings can be applied to incorporate perfect forward secrecy (PFS) and other features to peer-to-peer or other configurations of Wi-Fi networks, as well. Still further, while embodiments using the Wi-Fi wireless networking standards have been described, the provisioning of perfect forward secrecy (PFS) according to the present teachings can also be applied to networks other than Wi-Fi networks.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-5 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in the FIGS. 1-5 may be performed by corresponding functional means capable of performing the operations. Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may include a non-transitory computer readable medium (e.g., tangible media). In addition, in some aspects computer readable medium may include a transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer-readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc. Moreover, any other suitable technique for providing the methods and techniques described herein to a device can be utilized.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
   generating a shared master secret;
   generating a pair-wise transient key (PTK) and a set of shared ephemeral key data, wherein the PTK is generated based on the shared master secret, wherein the set of shared ephemeral key data is generated independent of the shared master secret, and wherein a validity duration of the set of shared ephemeral key data is less than a validity duration of the shared master secret; and
   encrypting at least one message that is to be transmitted to at least one station based on at least the shared master secret, the PTK, and the set of shared ephemeral key data.

2. The method of claim 1, wherein the shared master secret comprises a pair-wise master key (PMK).

3. The method of claim 2, wherein the PMK is generated based on a sequence (SEQ) message, a re-authentication master key (rMSK), an access point nonce, a station nonce, or a combination thereof.

4. The method of claim 1, wherein the set of shared ephemeral key data enables a Diffie-Hellman (DH) key exchange associated with an access point and the at least one station.

5. The method of claim 4, wherein the DH key exchange uses a set of keys selected from a DH group list specified by the access point.

6. The method of claim 5, wherein a first private key, a second private key, a first public key, and a second public key of the set of shared ephemeral key data are computed prior to the DH key exchange, wherein the first private key and the first public key are stored at the access point, wherein the second private key and the second public key are stored at the at least one station, and wherein the first public key and the second public key are exchanged during the DH key exchange.

7. The method of claim 4, wherein the DH key exchange uses a set of keys generated based on finite field arithmetic.

8. The method of claim 4, wherein the DH key exchange uses a set of keys generated based on elliptic curve arithmetic.

9. The method of claim 1, wherein the set of shared ephemeral key data is associated with a handshake exchange associated with an access point and the at least one station, the handshake exchange performed to authenticate communications associated with the access point and the at least one station.

10. The method of claim 9, wherein the handshake exchange associated with the access point and the at least one station comprises a handshake exchange using a Wi-Fi protocol.

11. The method of claim 9, wherein the handshake exchange comprises an extensible authentication protocol (EAP) exchange.

12. The method of claim 11, wherein an access point nonce associated with the handshake exchange is transmitted via a message other than a beacon message.

13. The method of claim 9, wherein the handshake exchange comprises a 4-way handshake.

14. The method of claim 1, wherein the set of shared ephemeral key data comprises a set of public keys generated based on a Diffie-Hellman (DH) key exchange and a set of private keys based on the DH key exchange.

15. The method of claim 14, further comprising deleting the set of private keys after the set of shared ephemeral key data is generated.

16. The method of claim 14, further comprising generating a plurality of sets of shared ephemeral key data to encrypt communications associated with an access point and a plurality of stations, wherein each set of shared ephemeral key data enables a respective handshake exchange associated with the access point and a respective one of the plurality of stations, and wherein a validity duration of each set of shared ephemeral key data is less than a validity duration of a corresponding shared master secret associated with the access point and the respective one of the plurality of stations.

17. The method of claim 1, further comprising generating a perfect forward secrecy pair-wise transient key (PFS-PTK) based on the shared master secret, the PTK, and the set of shared ephemeral key data.

18. The method of claim 1, wherein the encrypting of the at least one message associated with an access point and the at least one station implements perfect forward secrecy (PFS).

19. An apparatus comprising:
    a wireless network interface to at least one station; and
    a processor configured to communicate with the at least one station via the wireless network interface, the processor configured to:
    generate a shared master secret;
    generate a pair-wise transient key (PTK) and a set of shared ephemeral key data, wherein the PTK is generated based on the shared master secret, wherein the set of ephemeral key data is generated independent of the shared master secret, and wherein a validity duration of the set of shared ephemeral key data is less than a validity duration of the shared master secret; and
    encrypt at least one message that is to be transmitted to the at least one station using at least the shared master secret, the PTK, and the set of shared ephemeral key data.

20. The apparatus of claim 19, wherein the shared master secret comprises a pair-wise master key.

21. The apparatus of claim 19, wherein the set of shared ephemeral key data enables a Diffie-Hellman (DH) key exchange.

22. The apparatus of claim 21, wherein the DH key exchange uses a set of keys selected from a DH group list specified by an access point.

23. The apparatus of claim 22, wherein a first private key, a second private key, a first public key, and a second public key of the set of shared ephemeral key data are computed prior to the DH key exchange, wherein the first private key and the first public key are stored at the access point, wherein the second private key and the second public key are stored at the at least one station, and wherein the first public key and the second public key are exchanged during the DH key exchange.

24. The apparatus of claim 21, wherein the DH key exchange uses a set of keys generated based on finite field arithmetic or based on elliptic curve arithmetic.

25. The apparatus of claim 19, wherein the set of shared ephemeral key data is associated with a handshake exchange associated with an access point and the at least one station, the handshake exchange performed to authenticate communications associated with the access point and the at least one station.

26. The apparatus of claim 25, wherein the handshake exchange is associated with an access point system and the at least one station and the handshake exchange uses a Wi-Fi Protocol.

27. The apparatus of claim 25, wherein the handshake exchange comprises an EAP exchange, and wherein an access point nonce associated with the handshake exchange is transmitted via a message other than a beacon message.

28. The apparatus of claim 25, wherein the handshake exchange comprises a 4-way handshake.

29. The apparatus of claim 19, wherein the set of shared ephemeral key data comprises a set of public keys generated based on a Diffie-Hellman (DH) key exchange and a set of private keys generated based on the DH key exchange.

30. The apparatus of claim 29, wherein the processor is configured to delete the set of private keys after the set of shared ephemeral key data is generated.

31. The apparatus of claim 29, wherein the processor is configured to generate a plurality of sets of shared ephemeral key data to encrypt communications associated with an access point and a plurality of stations, wherein each set of shared ephemeral key data enables a handshake exchange associated with the access point and a respective one of the plurality of stations, and wherein a validity duration of each set of shared ephemeral key data is less than a validity duration of a corresponding shared master secret associated with the access point and the respective one of the plurality of stations.

32. The apparatus of claim 19, wherein the encrypting of the at least one message associated with the at least one station implements perfect forward secrecy (PFS).

33. An apparatus comprising:
   means for communicating with at least one station via a wireless network interface; and
   means for generating a shared master secret, a pair-wise transient key (PTK), and a set of shared ephemeral key data, wherein the PTK is generated based on the shared master secret, wherein the set of shared ephemeral key data is generated independent of the shared master secret, wherein a validity duration of the set of shared ephemeral key data is less than a validity duration of the shared master secret, and wherein at least one message that is to be transmitted to the at least one station is encrypted based on at least the shared master secret, the PTK, and the set of shared ephemeral key data.

34. A non-transitory computer readable medium comprising processor-executable instructions that, when executed by a processor, cause the processor to:
   generate a shared master secret;
   generate a pair-wise transient key (PTK) and a set of shared ephemeral key data, wherein the PTK is generated based on the shared master secret, wherein the set of shared ephemeral key data is generated independent of the shared master secret, and wherein a validity duration of the set of shared ephemeral key data is less than a validity duration of the shared master secret; and
   encrypt at least one message that is to be transmitted to at least one station based on at least the shared master secret, the PTK, and the set of shared ephemeral key data.

* * * * *